June 15, 1954   W. M. NICHOLS   2,681,049
FUEL CONTROL APPARATUS FOR INTERNAL-COMBUSTION ENGINES
Filed Feb. 1, 1950   4 Sheets-Sheet 1
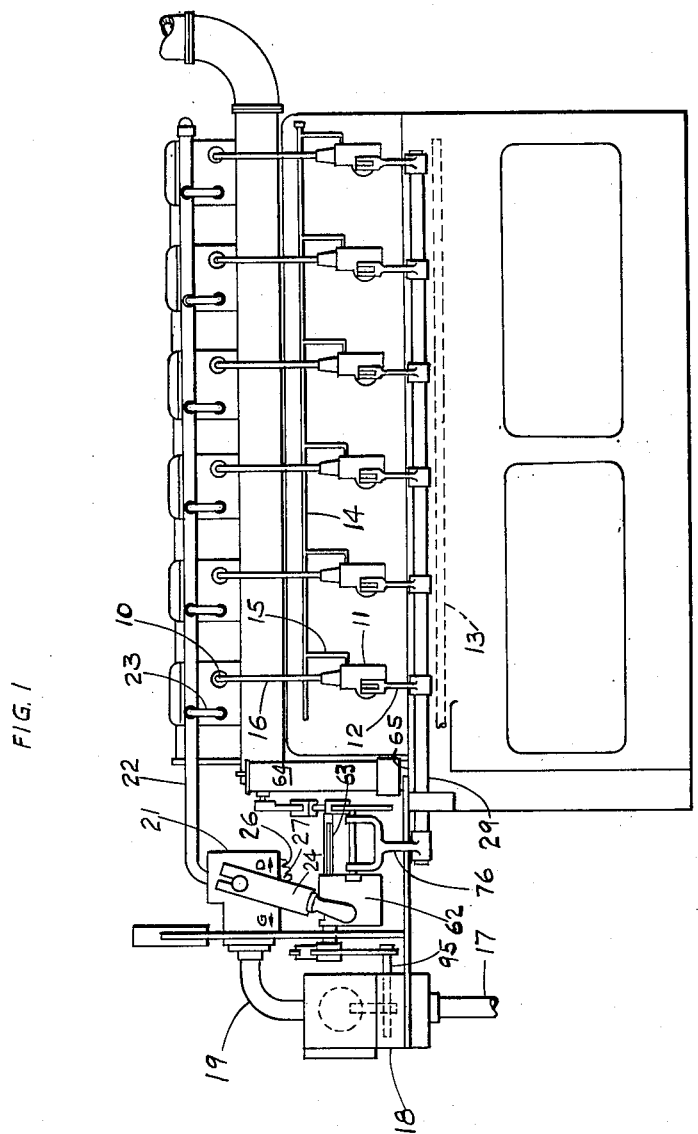
INVENTOR
WILLIAM M. NICHOLS
BY Maurice W. Grady
ATTORNEY

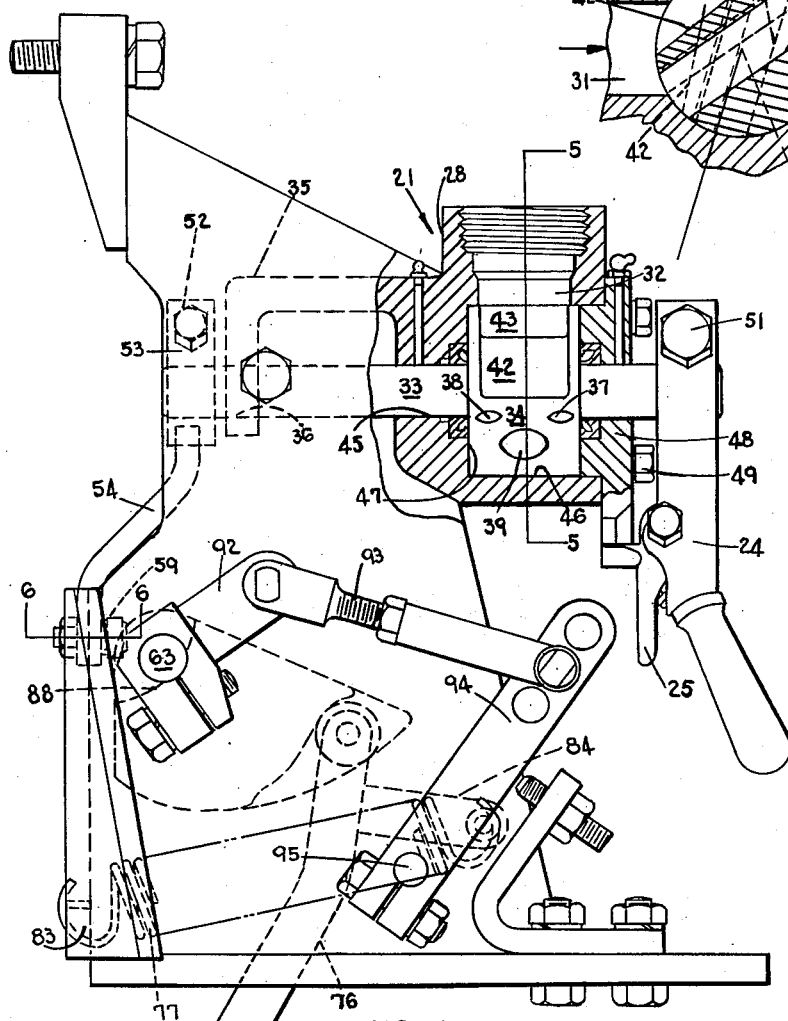
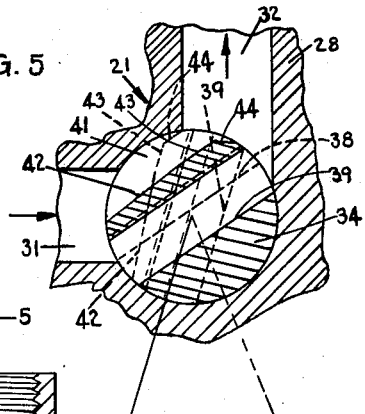
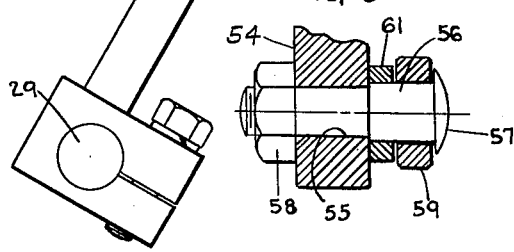

June 15, 1954 W. M. NICHOLS 2,681,049
FUEL CONTROL APPARATUS FOR INTERNAL-COMBUSTION ENGINES
Filed Feb. 1, 1950 4 Sheets-Sheet 3
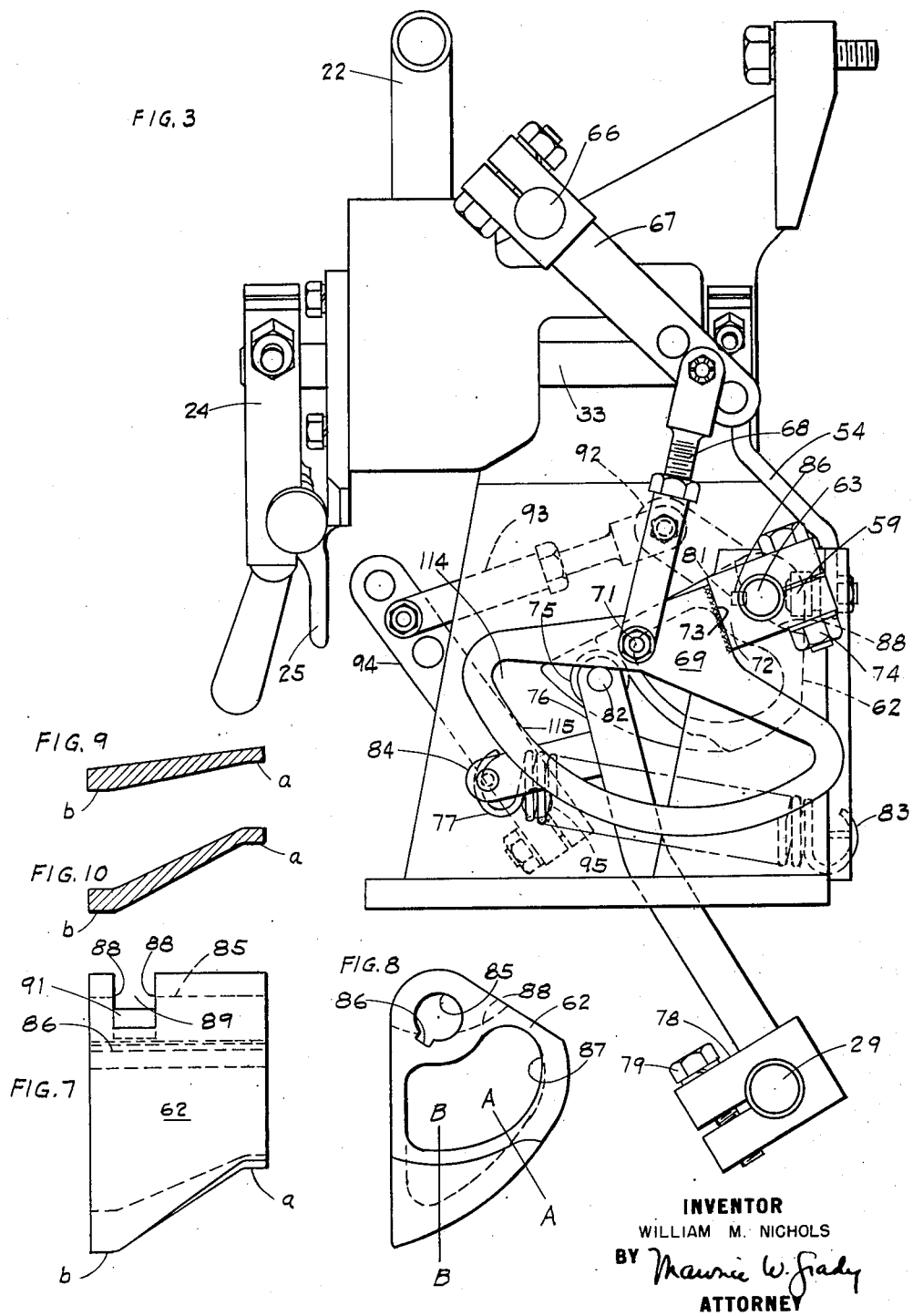
INVENTOR
WILLIAM M. NICHOLS
BY Maurice W. Grady
ATTORNEY June 15, 1954   W. M. NICHOLS   2,681,049
FUEL CONTROL APPARATUS FOR INTERNAL-COMBUSTION ENGINES
Filed Feb. 1, 1950   4 Sheets-Sheet 4
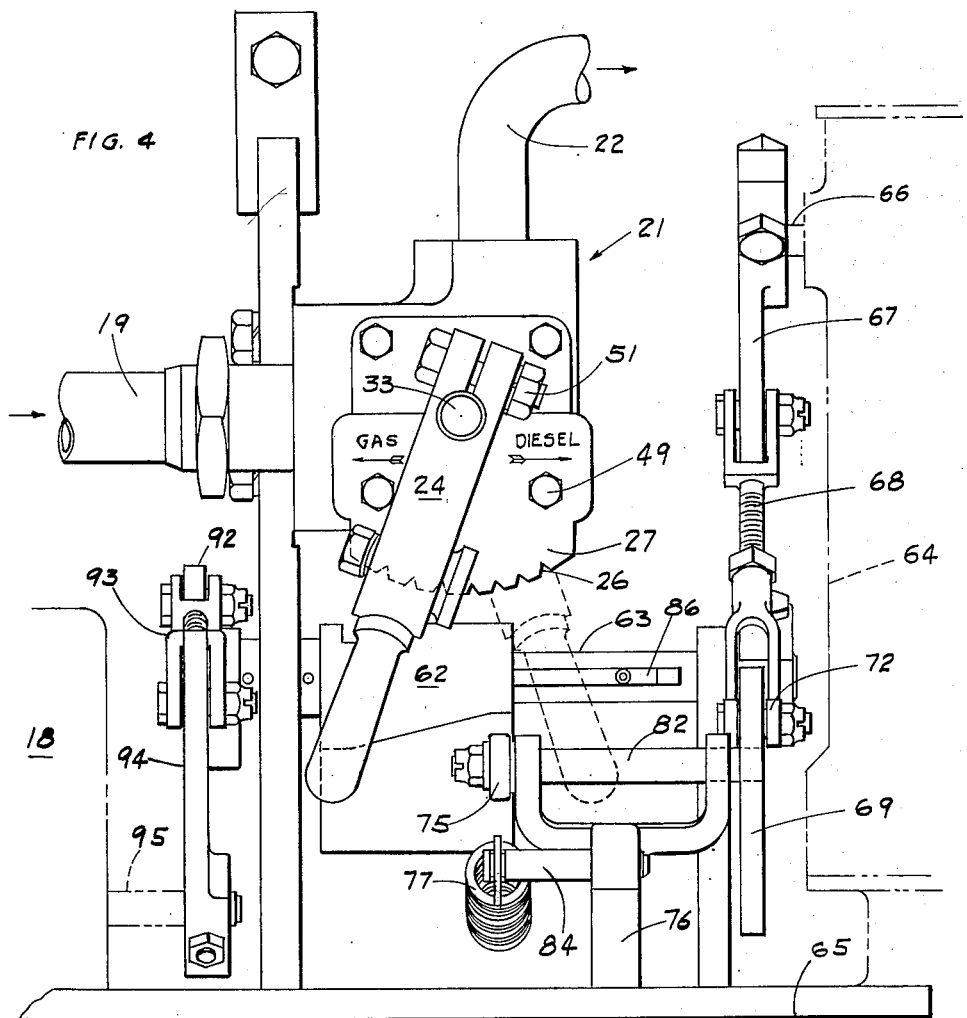
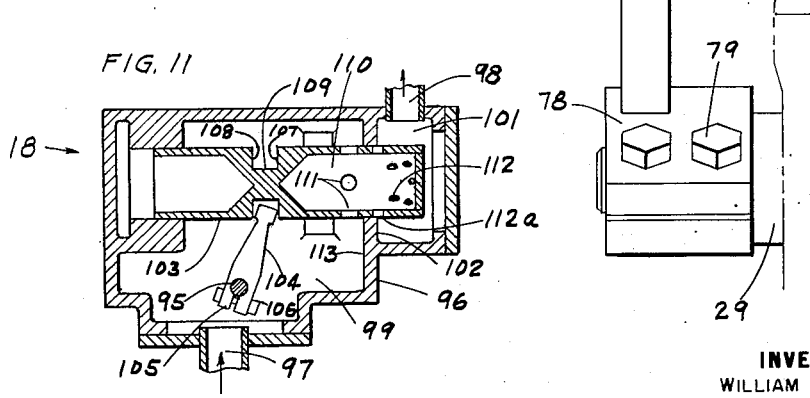
INVENTOR
WILLIAM M. NICHOLS
BY Maurice W. Grady
ATTORNEY

Patented June 15, 1954

2,681,049

UNITED STATES PATENT OFFICE 2,681,049

FUEL CONTROL APPARATUS FOR INTERNAL-COMBUSTION ENGINES

William M. Nichols, Schenectady, N. Y., assignor to American Locomotive Company, New York, N. Y., a corporation of New York Application February 1, 1950, Serial No. 141,799

6 Claims. (Cl. 123—27)

This invention relates to fuel control apparatus for internal combustion engines and particularly to "dual fuel" engines.

A "dual fuel" engine, as used in this application, includes an internal combustion engine operable solely on diesel oil, or solely on gas, or on a mixture of the two. Such an engine will have sufficient cylinder compression to function either as a direct injection diesel engine, or as a high compression gas engine; and in the latter case, ignition may be either by electric means or by pilot injection of diesel fuel through the oil fuel injectors. In the instant application no further reference will be made to ignition by electric means, pilot injection of diesel fuel being the means described. The engine will also be provided with fuel control apparatus which will supply both oil and gas as a mixed fuel, variable as desired.

Dual fuel engines are commonly used in territories where natural gas is available and also in manufacturing plants where by-products gas is produced. Such sources of supply, however, are frequently variable and unreliable; and, consequently, intermittent. Since such gases are cheaper than diesel fuel, they will be used whenever they can be had; and when the supply runs out, the engine is operated solely on diesel oil.

One type of dual fuel engine is constructed so that it will normally operate on gas as its fuel with diesel oil as a pilot fuel. If the supply of gas becomes insufficient for the demands of the engine, oil may be furnished for mixture with the gas to make up the deficiency. If the supply of gas completely runs out, temporarily, diesel oil is furnished to the combustion chamber as the sole source of power. That is to say, the engine will operate as a straight diesel. Such an engine, however, is hazardous to operate. If the supply of gas suddenly drops off when the engine is operating on mixed fuel, the governor provides for additional oil to make up the deficiency. Under such circumstances, due to local conditions, the supply of gas may suddenly and unexpectedly increase and rush into the combustion chamber. Such a sudden increase of gas fuel may result in dangerously high pressure or even damage to or destruction of the cylinders, since the governor cannot respond quickly enough to cut down the oil supply, especially if the engine is operating a synchronous generator connected to a light line with almost infinite load capacity. To eliminate such hazards is the principal object of the invention.

Another object is to provide safety apparatus in a dual fuel engine having means to selectively limit the maximum amount of gas transmissible through the gas line into the combustion chamber and to selectively limit the maximum amount of oil simultaneously supplied to the fuel injectors, such selective maximum amounts bearing a predetermined ratio one to the other and the means being adapted for selective positioning under the manual control of the operator.

Another object of this invention is to provide gas control apparatus for a dual fuel engine which will permit only a predetermined maximum amount of gas to be transmitted through the gas line to the combustion chambers regardless of the demands of the governor, such amount of gas bearing a definite ratio to the maximum amount of oil fuel that can be simultaneously supplied to the fuel injectors.

Another object is to provide in a dual fuel engine a valve in the gas supply line with apparatus to control such valve and simultaneously to control the fuel oil control shaft so that only a predetermined maximum amount of gas will be transmissible through the valve, regardless of the demands of the governor, such amount of gas bearing a definite ratio to the maximum amount of oil fuel that can be simultaneously supplied to the fuel injectors.

Still another object is to provide in a dual fuel engine a valve in the gas supply line between the governor regulating valve and the combustion chambers, a cam actuated by the transmission mechanism between the governor and the regulating valve, and a control unit operatively connected to the first gas valve and the cam, such unit functioning to limit to a predetermined maximum amount the gas transmissible through such valve to the combustion chamber, and the cam functioning to simultaneously limit the maximum amount of fuel oil transmissible through the fuel injectors.

Still another object is to provide such control apparatus comprising a valve in the gas line between the gas regulating valve and the combustion chambers and a manually operable control unit adapted to set such first valve in a plurality of operative positions, so that gas will be transmissible therethrough only within predetermined maximum limits, such control unit including in operative connection therewith a cam movable to a plurality of operative positions contemporaneously with the setting of the valve and simultaneously controlling the amount of fuel oil available for supplying the fuel injectors thereby establishing a definite ratio between the maximum amounts of gas and oil that may be supplied to the combustion chambers at any one time.

Other and further objects of this invention will appear from the following description, the accompanying drawings and the appended claims.

In the accompanying drawings:

Fig. 1 is in elevation of a dual fuel engine with the apparatus of the invention applied thereto; Fig. 2 is a side view, partly in section, of the apparatus of the invention; Fig. 3 is a side view, partly in section, of the apparatus of the invention as seen from the side opposite that from which the view in Fig. 2 is taken; Fig. 4 is a front view of the invented apparatus; Fig. 5 is a fragmentary section of the valve disposed in the gas fuel line between the gas metering valve and the combustion chamber; Fig. 6 is a detail view showing the mounting of the cam actuating roller upon the crank arm; Figs. 7 and 8 are front and side views, respectively, of the cam; Figs. 9 and 10 are sections of Figs. 7 and 8, respectively, taken along lines A—A and B—B, respectively. Fig. 11 shows detail of gas regulating valve. All figures are on the same scale except Figs. 1, 6, and 11, Figs. 1 and 11 being on a smaller scale and Fig. 6 being on a larger scale.

The engine shown diagrammatically in Fig. 1 is not described in detail as it is not thought necessary for a proper understanding of the apparatus of the invention. Suffice it to say that it is an internal combustion engine normally operable as a solid injection diesel engine. Fuel oil is injected directly into the cylinders (not shown) through injectors 10 supplied by pumps 11 actuated by transmission devices 12 associated preferably with the cam shaft 13. Fuel oil is supplied from an outside source (not shown) to the pumps through header 14 and inlet tubes 15, and is transmitted from the pumps through feedlines 16 to the injectors 10 disposed in the cylinder heads.

The engine is also adapted for operation on gas fuel. Gas may be supplied to the engine power cylinders from an outside source (not shown) through conducting means comprising pipe 17, regulating valve 18, elbow 19, changeover valve 21, header 22, and branches 23. The arrangement of the gas and oil supply lines and the operation of the control systems associated therewith, as will be later explained, are such that the engine may operate entirely on diesel oil, or entirely on gas (with only enough diesel oil supplied to the cylinders to effect ignition), or on a mixture of gas and oil in predetermined ratios.

Changeover or cut-off valve 21 (see Figs. 2, 4, and 5), as controlled by throttle lever 24 is adapted to afford passage of gas therethrough at seven different rates. Lever 24 carries a spring-urged latch 25 engageable with each of seven notches 26 formed upon quadrant 27 bolted to the housing 28 of the valve. When the operator sets lever 24 at the extreme right or "diesel" notch, as shown in the dotted line position of the lever in Fig. 4, valve 21 is in cut-off position so that no gas passes therethrough. When lever 24 is so disposed, fuel control shaft 29 is simultaneously rotated, by means hereinafter described, to full setting so that the engine operates entirely on oil fuel; that is to say as a straight diesel engine. As the operator sets the lever in successive notches to the left of that shown in dotted lines in Fig. 4, the amount of gas permitted to pass through valve 21 will be successively increased, but control shaft 29 will be rotated correspondingly to decrease the maximum amount of fuel oil that may be injected into the cylinders. When set at the extreme left or "Gas" notch, lever 24, as shown in full lines in Fig. 4, will move valve 21 to fully open position so that gas will pass therethrough at full capacity rate. Fuel control shaft 29 will simultaneously be turned to the position which permits injection of only the minimum amount of fuel oil or "pilot" oil required for ignition of the gaseous fuel. Valve 21 is so designed and the fuel oil pumps 11 are so controlled that the gas and oil fuel mixture effected by each setting of lever 24 will have substantially the same heat-producing capacity. In the illustrative embodiment seven positions of lever 24 are shown, but of course the number of such positions may be increased or decreased by the provision of more or less notches as desired.

Valve 21 comprises housing 28, inlet passage 31, outlet passage 32, rotatable shaft 33 (see Fig. 2), throttle member 34 formed integrally with shaft 33, and bracket 35 having an aperture 36 for supporting and journaling shaft 33. Throttle member 34 is cylindrical in cross section and is formed with a plurality of ducts 37, 38, and 39 extending therethrough and with a cut-out section 41 having sloped base portions 42, 43, and 44. Shaft 33 and the throttle member 34 may be set in seven selective positions by the operator's rotation of lever 24. When lever 24 is set to the extreme right or "diesel" position, throttle member 34 assumes the position shown in Fig. 5, in which ducts 37, 38, and 39 and cut-out section 41 are shown in dotted lines in which they are so disposed that gas cannot pass through the valve. Oil is then the sole fuel, as previously indicated. As lever 24 is moved to the left to engage the notch next adjacent the "Diesel" notch, sloped base portion 44 establishes restricted communication between the inlet and outlet passages 31 and 32 through cut-out 41 so that a small amount of gas is afforded passage therethrough to the gas line. Oil fuel to the injectors is simultaneously and correspondingly decreased to mix with the gas in the combustion chambers. As the lever is moved successively to the left to the various settings provided, the amount of gas allowed passage through the valve will increase as the flow areas through cut-out 41 and ducts 37, 38, and 39 increase until the extreme left position when maximum gas transfer is allowed.

Valve 21 is constructed to provide flow areas therethrough so proportioned as to give weight flow changes in linear relationship. That is to say, the flow change after each of the valve changeovers will be constant over the entire range of angular movements of lever 24. To effect such a result the flow areas vary according to the well known formulas of gas flow with variable back pressure.

To assemble valve 28, shaft 33 is inserted through bore 45 in the housing and aperture 36 in the bracket, and throttle member 34 is positioned in counterbore 46 flush against wall 47. Closure member 48 is then secured by bolts 49 to the housing to retain the shaft in operative position. The lower portion of closure 48 is formed as notched quadrant 27. Throttle lever 24 is thereafter clamped upon the shaft by means of bolt 51.

Clamped tightly upon the outer end of shaft 33 (see Fig. 2) by bolt 52 is a jaw 53 which is rotatable with such shaft to any of seven positions corresponding to the settings of lever 24.

Extending downwardly and outwardly from jaw 53 is a carrier arm or crank 54 the lower end of which has an aperture 55 (Fig. 6) for the mounting of a stud 56 therein. The stud has a head 57, and is threaded for the reception of nut 58. A roller 59 is rotatably mounted upon the stud and is disposed in spaced relation to the carrier arm by spacer 61. Crank 54 functions to slide cam 62 longitudinally along transmission shaft 63 to selected positions for purposes later to be described.

Governor 64 is mounted on the cylinder block 65 and is shown as a Woodward governor of the hydraulic type, such as is illustrated and described in Patent No. 2,039,507. Governor 64 is engine-driven through the medium of a conventional gear connection (not shown) with cam shaft 13. Motion is transmitted from the power takeoff shaft 66 of the governor to fuel pump control shaft 29 through linkage elements 67 and 68, actuator 69 (pivoted at 71 to link 68 and having a clamping jaw 72 welded thereto as at 73), transmission shaft 63 (rotatable by jaw 72 rigidly clamped thereto by bolt 74), cam 62, follower roller 75, yoke lever 76, tension spring 77, and clamping jaw 78, the latter being rigidly clamped to shaft 29 by bolts 79. As the load demand increases, governor shaft 66 will rotate clockwise, as viewed in Fig. 3. Lever 67 will also be rotated clockwise to depress link 68 and actuator 69. Since actuator 69 and jaw 72 are welded together to form a unit pivotable on shaft 63, counterclockwise motion will be imparted to shaft 63. Cam 62 is keyed at 81 to shaft 63 for rotation therewith and supports follower roller 75 which is mounted upon pin 82 carried by the yoke lever 76. Tension spring 77 is anchored at one end to the engine frame at 83, and its other end is secured to stud 84 extending from lever 76 so that the follower roller is biased against the cam.

Cam 62 (see Figs. 7 to 10 inclusive) has a bore 85 for its mounting upon transmission shaft 63, a keyway 86 being provided in the cam and in shaft 63 for the reception of a key 81 so that the cam is feathered or slidable upon the shaft. The working surface of the cam (Figs. 7 and 8) is formed at one end with a zone "a" which is concentric with shaft 63 and has a uniform width equal to the width of roller 75. At the other end of the cam, zone "b" is also of uniform width equal to the width of 75, but is uniformly curved eccentrically to shaft 63. Between zones "a" and "b" the working surface blends gradually in straight lines, as shown in Figs. 9 and 10, which are sections of the cam taken as indicated. An irregularly shaped hole 87 is cut through the body of the cam for lightening purposes.

Cam 62 may be set at any one of seven desired positions with reference to the follower 75 by sliding movement along shaft 63. As best shown in Fig. 4, throttle lever 24 may be swung by the operator to selected positions in which the spring urged latch 25 will engage the notches of quadrant 27. Throttle shaft 33 is at the same time correspondingly rotated through a desired arc, and lever-arm 54 swings roller 59 laterally along an arcuate course in a plane parallel to the axis of shaft 63. Roller 59 engages the walls 88 of recess 89 to move the cam along the shaft one way or the other as desired. Recess 89 in the cam is formed with a curved bottom wall 91 to provide clearance for the roller. Cam 62 may thus be moved axially to a desired locked position upon shaft 63, and the surface of the cam, on such setting, will determine the position of the roller follower 75. For example, in Fig. 4, lever 24 is set in engagement with the notch at the extreme left or "gas" position of quadrant 27. Cam 62 is accordingly disposed at its extreme left or "gas" position on the shaft 63 so that follower 75 is biased by spring 77 against zone "a" of the cam. If lever 24 should be moved to the extreme right notch or "Diesel" setting, cam 62 would be moved along shaft 63 by the action of the swinging roller 59 to its extreme right position, and the follower roller 75 would rest against zone "b" of the cam. If lever 24 is positioned in any of the five notches between the end notches, the follower roller will assume a corresponding one of the five positions against the five corresponding zones of the cam face. If, while the cam is in any of the seven positions described, shaft 63 is rotated counterclockwise in response to the action of the governor's demand for more fuel, cam 62 will rotate therewith, and the spring urged yoke lever 76 will likewise rotate in a counterclockwise direction, except when roller 75 is positioned against zone "a." No angular motion will be imparted to lever 76 when contact is with zone "a" since the cam surface of such zone is concentric with shaft 63. Fuel oil control shaft 29 is rotated contemporaneously with cam 62 and to the extent that the cam requires in accordance with the demands of the governor thereby to provide more fuel oil for the injectors. Of course, if the governor demands less fuel, the procedure just described will be reversed and shaft 29 will be rotated clockwise to diminish the amount of oil supplied to the injectors.

Transmission shaft 63, in addition to serving to rotate cam 62, functions to actuate the linkage comprising lever 92, link 93, and lever 94 to rotate shaft 95 which controls gas regulating valve 18. Valve 18, shown in detail in Fig. 11, is of a well known type and its particular structure is not claimed, as such, as part of the invention. Suffice it to say, that housing 96 has inlet and outlet passages 97 and 98, a chamber 99 to receive gas under pressure from pipe 17 through inlet passage 97, a reservoir 101 adjacent chamber 99 and separated therefrom by wall 102, and a reciprocable piston 103. Piston 103 is controlled by rocking lever 104 which is clamped to shaft 95 by jaw 105 and bolt 106 and which alternately engages the walls 107 and 108 of annular groove 109 formed in such piston. The piston has a chamber 110 at its forward end, and ports circumferentially arranged in the piston to permit gas to be supplied to such chamber 110 from chamber 99. Ports 112 provide for the passage of gas from the chamber 110 into reservoir 101, and the amount of gas thus transmitted is determined by the number, size, and arrangement of such ports. The position of the piston determines the extent of communication between reservoir 101 and chamber 110. If, for example, the piston is at an intermediate position, as shown in Fig. 11, gas will pass from chamber 99 through ports 111 into chamber 110 and thence into chamber 101 through a portion of each of the ports 112a and the remainder of ports 112 to the right of wall 102. If shaft 95 is rotated clockwise from the position shown, piston 103 will be shifted to the right, the walls of ports 111 will be brought into alignment with the inner face 113 of wall 102, and maximum transfer from reservoir 99 to chamber 101 will still be effective. All ports 112 will then be in communication with reservoir 101. If shaft 95 is rotated counterclockwise to its limit position, the piston will be shifted to the left so that all ports 112 will be moved out of communication with reservoir 101, and of course no transfer will take place. That is to say the valve is in fully closed position.

It is now apparent that fuel oil control shaft 29 and actuating shaft 95 of the regulating valve 18 rotate simultaneously and in predetermined relation in response to the demands of the governor. As the load demands of the engine increase, oil and gas are passed through the injectors and the regulating valve respectively in increased amounts, as controlled by the governor. Valve 21, however, controls the maximum amount of gas that may pass into the power cylinders regardless of the amount that may pass through valve 18. If lever 24 is set at diesel position, no gas will pass through valve 21 even though the governor has opened valve 18 to its fully open position. If lever 24 is set at any other position, gas will pass through valve 21 at a rate depending upon the lever setting; and, within the limit of transfer established by valve 21, gas supplied will vary in accordance with the demands of the governor.

It should be here noted that if lever 24 is set at "gas" position and only pilot oil is fed to the injectors that the engine will stall if the supply of gas should fail or drop off sufficienty at its outside source. No provision is made for the automatic increase in fuel oil in such case. It should further be noted that if lever 24 is set at an intermediate position, it will not be possible to have a maximum supply of gas and oil at the same time. If lever 24 is set say at the notch next to "diesel" position, and there should be a dropping off in the supply of gas, diesel oil will furnish all the fuel required or the engine will stall. If while the engine is thus operating on diesel oil, the gas supply should suddenly return and the gas rushes through the regulating valve (which may be fully open because of the demands of the governor) valve 21 will prevent the rush of gas from reaching the power cylinders. Valve 21 then functions as a safety valve.

Actuator 69 is formed with an irregularly shaped aperture 114 (Fig. 3) through which the outer end of pin 82 extends. Such an arrangement is provided to retrieve yoke lever 76 in the event spring 77 should for any reason become inactivated. Normally spring 77 functions by exerting pressure upon stud 84 to maintain roller 75 in rolling contact with cam 62. If the spring should become inactivated, the yoke lever would drop back in a counterclockwise direction away from the cam working surface; and if at such a time the engine load should drop, the governor would be ineffective to reduce the oil supply to the injectors. Racing of the engine would result. It is the purpose of the retrieving arrangement herein to prevent such an occurrence. Actuator 69, under such circumstances, will rotate counterclockwise and wall 115 of aperture 114 will engage pin 82 to rotate yoke lever 76 and hence shaft 29, to cut down the oil supply.

While there has been hereinbefore described an approved embodiment of this invention, it will be understood that many and various changes and modifications in form, arrangement of parts and details of construction may be made without departing from the spirit of the invention, and that all such changes and modifications as fall within the scope of the appended claims are contemplated as a part of this invention.

The invention claimed and desired to be secured by Letters Patent is:

1. Fuel control apparatus for a dual fuel internal combustion engine comprising conducting means to supply gas fuel to a power cylinder, a regulating valve in such conducting means, a cut-off valve in the conducting means in series with the regulating valve and such cylinder, means to supply solid fuel to such cylinder, a governor responsive to the speed of the crankshaft, means actuated by the governor to simultaneously control the regulating valve and the solid fuel supply means to vary the supply of gas and solid fuel to the power cylinder in predetermined proportions over the total load range, and control apparatus associated with the cut-off valve to position such valve to provide a predetermined limit to the supply of gas passing therethrough to the power cylinder and at the same time to position the solid fuel supply means to provide a predetermined limit to the supply of solid fuel passing to the power cylinder.

2. Fuel control apparatus for a dual fuel internal combustion engine comprising conducting means to supply gas fuel to a power cylinder, a regulating valve in such conducting means, a cut-off valve disposed in the conducting means in series with the regulating valve and the power cylinder, means including a pump and a fuel injector to supply solid fuel to the cylinder, a control shaft to vary the supply of such fuel from the pump to the injector, a governor responsive to the speed of the crankshaft, linkage operatively connecting the governor and the control shaft thereby to vary the supply of solid fuel to the cylinder in accordance with the requirements of the governor over the whole load range, means operatively connected with said linkage to control the regulating valve simultaneously with its varying of the solid fuel supply and in accordance with the requirements of the governor over the whole load range, means to position the cut-off valve to limit the maximum amount of gas passing therethrough, means associated with such positioning means to vary the operative connection between the governor and the control rod whereby the amount of solid fuel supplied by the solid fuel supply means may be predetermined in relation to the amount of gas passing through the cut-off valve.

3. Fuel control apparatus for a dual fuel internal combustion engine comprising conducting means to supply gas fuel to a power cylinder, a regulating valve in such conducting means, a cut-off valve disposed in the conducting means in series with the regulating valve and the cylinder, means including a pump and fuel injector to supply solid fuel to the cylinder, a control rod to vary the supply of such fuel from the pump to the injector, a governor responsive to the speed of the crankshaft, a rotatable shaft, transmission linkage between the governor and the shaft, other transmission linkage between the shaft and the regulating valve, the arrangement of the transmission linkages and intervening shaft being such that motion is transmitted from the governor to the regulating valve to control its operation, a cam slidably mounted upon the shaft and rotatable therewith, follower means associated with the cam and connected to the control rod whereby motion is transmitted from the governor through the shaft to the control rod to control the latter simultaneously with the control of the regulating valve, means to control the cut-off valve, and means connected with such control means to shift the cam along the shaft thereby to control the control rod to predetermine the supply of fuel oil in relation to the flow of gas through the cut-off valve.

4. In a dual fuel engine of the class wherein oil and gas are supplied in predetermined mixed proportions to the power cylinders, the former through a fuel injector and the latter through a supply line having a regulating valve, the injector and the valve being controlled by a governor actuated by the crankshaft, a control system comprising a cut-off valve in the gas supply line in series with the regulating valve and the power cylinders adapted to be set in a plurality of positions to permit the passage of gas therethrough in predetermined amounts, manual means to set such valve, a cam operable by the means connecting the governor and the gas line regulating valve, means connecting the cam and the control rod, and means operatively connecting the manual means and the cam whereby the latter may be controlled to variably actuate the control rod so that oil will be supplied to the injector in amounts having a predetermined relation to the flow of gas through the cut-off valve.

5. Fuel control apparatus for a dual fuel internal combustion engine comprising a regulating valve in the gas supply line, a cut-off valve in the gas line in series with the regulating valve and the power cylinders, oil fuel injectors, a control rod to control the supply of oil fuel to the injectors, a governor responsive to the speed of the crankshaft, a transmission shaft operatively connected with the governor, means connecting such shaft and the regulating valve, means including a cam on such shaft connecting the shaft and the control rod thereby to transmit selective motion from the governor to the control rod, a manually operable lever adapted to selectively limit the flow area through the cut-off valve, and connecting means between the lever and the cam adapted to selectively position the cam to transmit predetermined control motion from the governor to the control rod, thereby to provide a supply of oil to the injectors in predetermined ratio to the supply of gas passing through the cut-off valve.

6. Fuel control apparatus for a dual fuel internal combustion engine comprising conducting means to supply gas fuel to the power cylinder, a regulating valve in the gas conducting means, a cut-off valve in the conducting means in series with the regulating valve and the power cylinder, means to supply oil fuel to the cylinder including an injector, a pump, and a control rod, an engine driven governor, a transmission shaft, linkage between the governor and the shaft, linkage between the shaft and the regulating valve, the arrangement of the shaft, regulating valve, and linkages being such that the regulating valve passes gas fuel therethrough in response to the demands of the governor, a cam on the transmission shaft, a follower for the cam, means connecting the follower and the control rod, the arrangement of the shaft, cam, follower, connecting means and the control rod being such that the control rod functions in response to the demands of the governor, a manually operable lever for the cut-off valve adapted to selectively set such valve to limit the supply of gas passing therethrough, a linkage between such lever and the cam to move the cam to predetermined positions corresponding to the selective settings of the cut-off valve whereby the maximum amount of oil supplied to the power cylinders corresponding to each setting of the cam shall bear a predetermined ratio to the maximum amount of gas passable through the cut-off valve at the corresponding setting thereof.

References Cited in the file of this patent

UNITED STATES PATENTS

| Number | Name | Date |
|---|---|---|
| 1,858,824 | Heidelberg | May 17, 1932 |
| 2,400,219 | Barnaby et al. | May 14, 1946 |
| 2,489,405 | Doyle | Nov. 29, 1949 |

FOREIGN PATENTS

| Number | Country | Date |
|---|---|---|
| 404,612 | Germany | Oct. 21, 1924 |
| 530,358 | Great Britain | Dec. 10, 1940 |

OTHER REFERENCES

Gas and Oil Power, Oct. 1940, page 209–Cy.
The Oil Engine, Oct. 1941, page 148–Cy.